United States Patent
Thomasson et al.

(10) Patent No.: US 9,042,355 B2
(45) Date of Patent: May 26, 2015

(54) QUALITY OF SERVICE (QOS) FOR SATELLITE COMMUNICATIONS NETWORK

(75) Inventors: Joseph F. Thomasson, Allen, TX (US); Danny Matthew Fleeman, McKinney, TX (US); Richard D. Hieb, Lake Dallas, TX (US); Arthur John Bolton, Plano, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 414 days.

(21) Appl. No.: 13/030,286

(22) Filed: Feb. 18, 2011

(65) Prior Publication Data

US 2012/0213210 A1    Aug. 23, 2012

(51) Int. Cl.
| | | |
|---|---|---|
| H04W 4/00 | (2009.01) |
| H04B 7/185 | (2006.01) |
| H04W 24/00 | (2009.01) |
| H04W 24/08 | (2009.01) |
| H04W 28/02 | (2009.01) |
| H04W 28/10 | (2009.01) |
| H04W 72/04 | (2009.01) |
| H04W 72/14 | (2009.01) |
| H04W 72/12 | (2009.01) |

(52) U.S. Cl.
CPC ........... *H04B 7/18528* (2013.01); *H04W 24/00* (2013.01); *H04W 24/08* (2013.01); *H04W 28/02* (2013.01); *H04W 28/10* (2013.01); *H04W 72/04* (2013.01); *H04W 72/14* (2013.01); *H04W 72/1205* (2013.01)

(58) Field of Classification Search
CPC ..... H04W 24/00; H04W 24/02; H04W 24/08; H04W 28/02; H04W 28/10; H04W 72/04; H04W 72/14
USPC ........................................................ 370/337
See application file for complete search history.

(56) References Cited

U.S. PATENT DOCUMENTS

| | | | |
|---|---|---|---|
| 7,360,083 B1 * | 4/2008 | Ragireddy et al. | 713/160 |
| 7,843,843 B1 * | 11/2010 | Papp et al. | 370/252 |
| 2003/0035385 A1 * | 2/2003 | Walsh et al. | 370/316 |
| 2004/0177087 A1 * | 9/2004 | Wu et al. | 707/102 |
| 2009/0059789 A1 * | 3/2009 | Underwood | 370/235 |

* cited by examiner

*Primary Examiner* — Yemane Mesfin
*Assistant Examiner* — Jeff Banthrongsack

(57) ABSTRACT

A device stores a traffic management profile for satellite network traffic that provides default percentages for classes of traffic that can pass when contention for limited bandwidth exists. The device receives packets having class markings and designated for transmission over a Demand-Assigned Time Division Multiple Access (DA-TDMA) network and identifies each of the received packets as one of a transmission control protocol (TCP) packet or a non-TCP packet. The device assigns the received packets to different queues based on the class markings and the identifying as a TCP packet or non-TCP packet, and determines available transmission bandwidth for a particular time slot of the DA-TDMA network associated with the device. The device also schedules packets from the different queues based on the default percentages in the traffic management profile and the transmission bandwidth for the particular time slot.

20 Claims, 6 Drawing Sheets

FIG. 4

| PROFILE TYPE | PRIORITY | COST-BASED CLASS 1 | | COST-BASED CLASS 2 | | COST-BASED CLASS 3 | | COST-BASED CLASS 4 | | DEFAULT | |
|---|---|---|---|---|---|---|---|---|---|---|---|
| | | TCP | OTHER | TCP | OTHER | TCP | OTHER | TCP | OTHER | TCP | OTHER |
| TIER 1 | 100% | 29.6% | 29.6% | 17.4% | 17.4% | | | | | 3% | 3% |
| TIER 2 | 100% | 30% | 30% | 10% | 10% | 7.5% | 7.5% | 0.5% | 0.5% | 2% | 2% |
| TIER 3 | 100% | 10% | 10% | 7.5% | 7.5% | 30% | 30% | 0.5% | 0.5% | 2% | 2% |
| TIER 4 | | 10% | 10% | 30% | 30% | 7.5% | 7.5% | 0.5% | 0.5% | 2% | 2% |
| STANDARD | | | | | | | | | | 50% | 50% |

· · ·

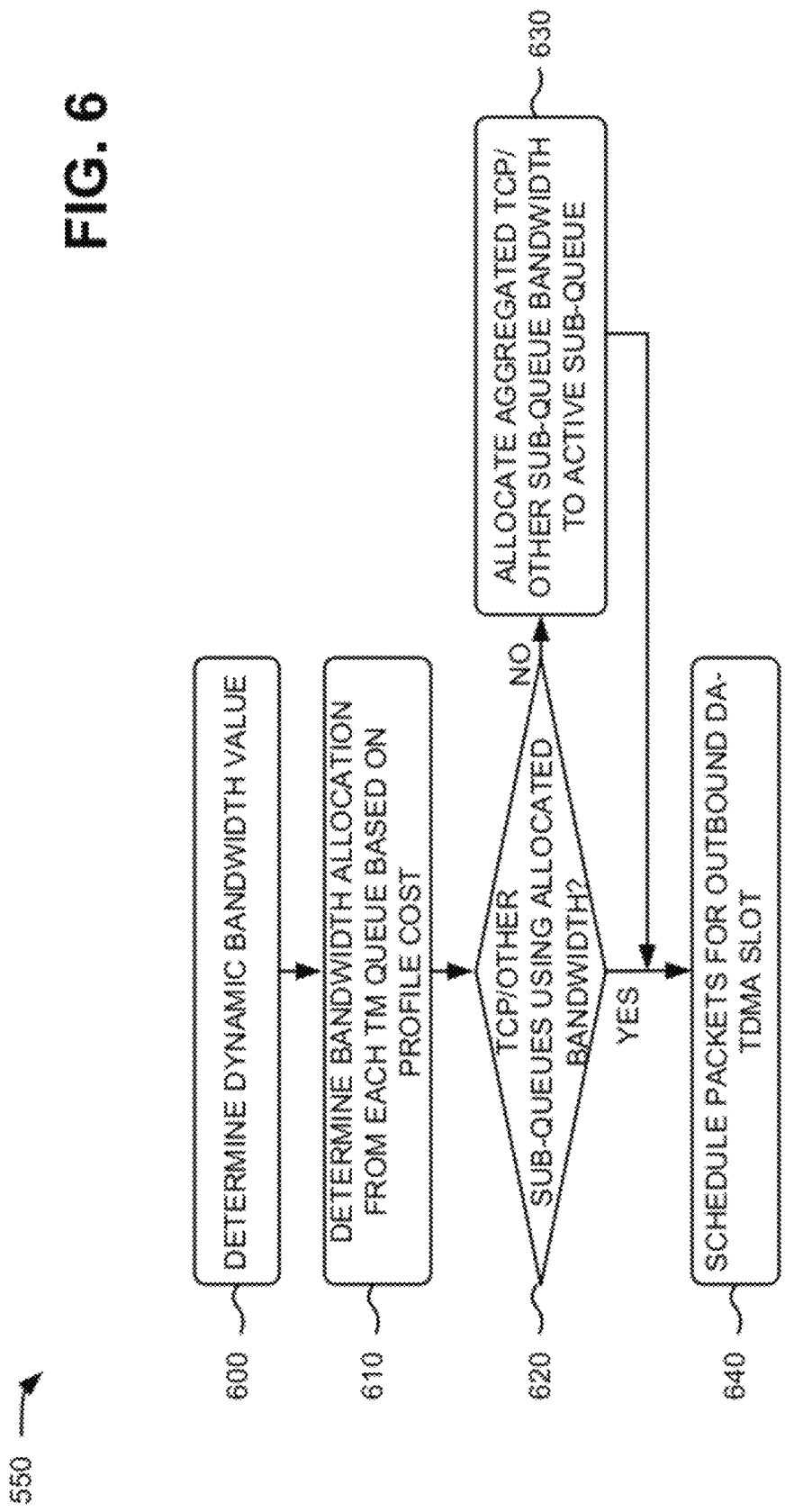

QUALITY OF SERVICE (QOS) FOR SATELLITE COMMUNICATIONS NETWORK

BACKGROUND

Very Small Aperture Terminal (VSAT) systems are satellite communications systems that serve home and business users. VSAT may be used to provide broadband access to remote customers. VSAT may employ demand-assigned time division multiple access (DA-TDMA) techniques to share satellite bandwidth among remote customers at different sites based on allocation of time slots rather than frequency. Network operators and service providers afford to their VSAT customers a variety of services. These services may include data, voice, and multimedia. Regardless of the type of service, it is desirable to offer customers a certain level of quality of service (QoS). Typically, in order to provide QoS guarantees, packets may be classified into predefined service classes. Terrestrial-based QoS models may apply QoS policies to the classified packets based on a fixed available data rate. In contrast with terrestrial systems, VSAT systems have variable bandwidth that precludes the use of conventional QoS models.

BRIEF DESCRIPTION OF THE DRAWINGS

FIG. 4 is a diagram of example fields that may be stored within a Quality of Service (QoS) mapping table depicted in FIG. 3 according to an implementation described herein; and FIGS. 5 and 6 are flow charts illustrating an example process for providing QoS over a satellite network according to an implementation described herein.

DETAILED DESCRIPTION OF PREFERRED EMBODIMENTS

The following detailed description refers to the accompanying drawings. The same reference numbers in different drawings may identify the same or similar elements.

Systems and/or methods described herein may provide a quality of service (QoS) model for private Internet protocol (IP) traffic over satellite. The systems and/or methods may apply variable bandwidth assignments, based on network demand, among multiple remote sites in a demand-assigned time division multiple access (DA-TDMA) network. Thus, the systems and/or methods may provide a percentage QoS equivalent to a terrestrial-based QoS model based on bandwidth allocated over discrete bursts in the DA-TDMA network.

In one example implementation, the systems and/or methods may store a traffic management profile for outbound satellite network traffic that provides default percentages for classes of traffic that can pass if contention for limited bandwidth exists. The systems and/or methods may receive packets having class markings and designated for outbound delivery over a DA-TDMA network and may identify each of the received packets as one of a transmission control protocol (TCP) packet or a non-TCP packet. The systems and/or methods may assign the received packets to different queues based on the class markings and the identifying as a TCP packet or non-TCP packet, and may determine available outbound bandwidth for a particular time slot of the DA-TDMA network associated with the device. The systems and/or methods may also schedule packets from the different queues based on the default percentages in the traffic management profile and the outbound bandwidth for the particular time slot.

Figure 1:
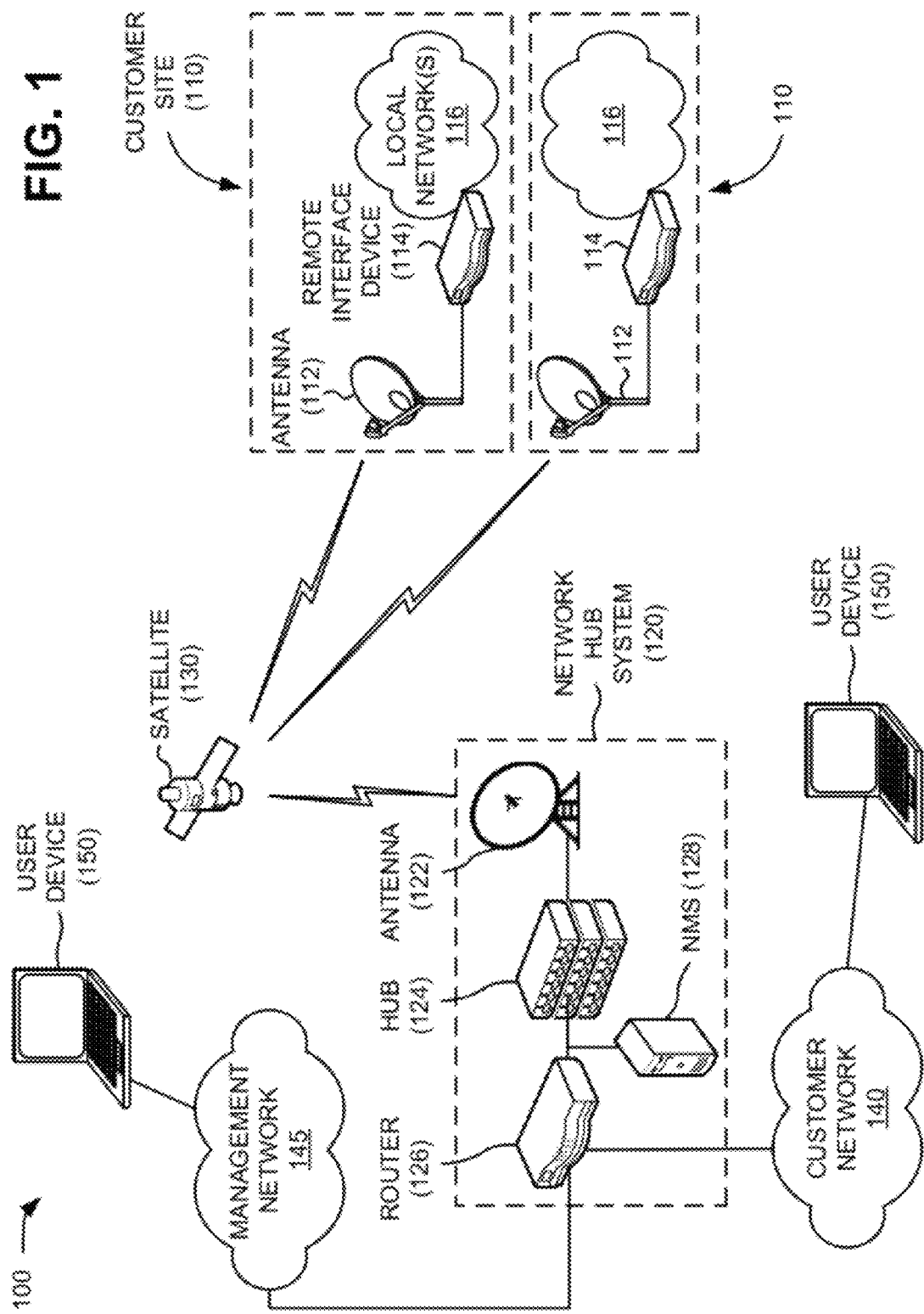
FIG. 1 is a diagram of an example network in which systems and/or methods described herein may be implemented.

FIG. 1 is a diagram of an example network 100 in which systems and/or methods described herein may be implemented. As illustrated, network 100 may include one or more customer sites 110, a network hub system 120, a satellite 130, a customer network 140, a management network 145, and multiple user devices 150. Two customer sites 110, one network hub system 120, one satellite 130, one customer network 140, one management network 145, and two user devices 150 have been illustrated in FIG. 1 for simplicity. In practice, there may be more customer sites 110, network hub systems 120, satellites 130, customer networks 140, management networks 145, and/or user devices 150. Components of network 100 may interconnect via wired and/or wireless connections (or links).

Customer sites 110 may include one or more devices connected to each other and/or network hub system 120 via satellite 130. Customer sites 110, also referred to as remote sites, may share bandwidth within network 100 using DA-TDMA network techniques. Thus, bandwidth allocations may not be fixed at each customer site 110, but can vary based, for example, upon current network demands among all customer sites 110. Each customer site 110 may include an antenna 112, a remote interface device 114, and one or more local networks 116.

Antenna 112 may provide an interface for broadband communications broadcast to/from satellites (e.g., satellite 130).

Remote interface device 114 may manage traffic to/from local network 116. Remote device may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. In implementations described herein, remote interface device 114 may apply a predefined profile template to regulate traffic flow from customer site 110 to network hub system 120 (referred to herein as "inroute" traffic). The profile template may be selected by the customer to provide different percentage allocations per classes of service based on the specific customer requirements. The profile template may be applied on a per-device basis, such that different profile templates may be used by each remote interface device 114. Profile templates are described further in connection with, for example, FIG. 4.

Local network 116 may include devices that generate and/or receive traffic (e.g., packets) for broadband services, such as data, voice, and multimedia services. Devices in local network 116 may include, for example, computing devices (e.g., desktop computers, laptop computers, personal digital assistants (PDA), etc.,), telephones (e.g., a voice-over-IP (VoIP)-enabled phone), set-top boxes (STBs), and/or networking equipment (e.g., routers, cables, splitters, local gateways, etc.). Devices within local network 116 may be connected via wired or wireless connections (e.g., using network devices such as those available under the IEEE 802.11 wireless local area network (LAN) standards). Traffic from devices in local network 116 may be classified into predefined service classes and assigned to a particular outgoing queue based on the classification. In implementations described herein, traffic from local network 116 may be prioritized (e.g., according to a particular inroute profile template) based on the outgoing queues prior to exiting remote interface device 114.

Network management hub 120 may include an antenna 122, a hub 124, a router 126, and a network management system 128. In one implementation, network management hub 120 may control and monitor antenna 122, hub 124, router 126, and network management system 128 to provide broadband communication services to customer sites 110.

Antenna 122 may provide an interface for broadband communications broadcast to/from satellites (e.g., satellite 130).

Hub 124 may include one or more one or more data processing, data transfer devices, or other types of computation or communication devices, that gather, process, search, and/or provide information in a manner described herein. In one implementation, hub 124 may implement IP routing and load balancing for a DA-TDMA network based on profile templates for traffic from network hub system 120 to customer sites 110 (referred to herein as "outroute" traffic). For example, hub 124 may include functionality similar to remote interface device 114 to buffer and forward data packets toward destinations based on class designations and available outroute bandwidth to each particular customer site 110. The profile template may be applied on a per-device basis, such that different profile templates may be used for traffic to different customer sites 110.

Router 126 may include one or more traffic transfer devices, such as a gateway, a router, a switch, a firewall, a NIC, a hub, a bridge, a proxy server, an OADM, or some other type of device that processes and/or transfers traffic. In one example implementation, router 126 may receive traffic (e.g., packets) from customer sites 110, and may provide the traffic to other devices and/or networks (e.g., customer network 140 or another network). In another example implementation, router 126 may receive traffic (e.g., packets) from other devices and/or networks and may forward the traffic to customer sites 110 (e.g., via hub 124 and satellite 130).

Network management system 128 may include one or more server devices, or other types of computation or communication devices, that gather, process, search, and/or provide information in a manner described herein. In an example implementation, network management system 128 may monitor and administer a network, such as network 100. Network management system 128 may also configure a network to enforce a set of rules or functions regarding traffic handled by certain portions (e.g., restricted portions) of the network. Examples of such rules may include: (1) limiting entrance of traffic of certain classes to a portion of the network; (2) preventing traffic of certain classes from exiting a portion of the network; (3) preventing traffic of certain classes from using a portion of the network as a transit route; and/or (4) isolating a portion of the network from the remaining network but permitting communication within the isolated portion.

Satellite 130 may transmit data from customer sites 110 to network hub system 120 and from network hub system 120 to customer sites 110. Satellite 130 may receive/provide signals to customer sites 110 and/or network hub system 120 over a designated broadband frequency. The signals may be sent/received at customer site 110 using antenna 112 and may be sent/received at network hub system 120 using antenna 122.

Customer network 140 may include a LAN, a wide area network (WAN), a metropolitan area network (MAN), a telephone network, such as the Public Switched Telephone Network (PSTN), an intranet, the Internet, an optical fiber (or fiber optic)-based network, a cable television network, a satellite television network, or a combination of networks. In one implementation, customer network 140 may include a reporting system to receive traffic management data from network management system 128 and/or customer sites 110 and to generate reporting statistics regarding traffic management of network 100.

Management network 145 may include one or more devices to provide reporting capabilities for percentage-based packet delivery in network 100. For example, management network 145 may include communication and/or computation devices to pull statistics from remote interface devices 114 and/or hub 124 to compile QoS reports for particular customers.

User device 150 may include any device that is capable of communicating with customer network 140 and/or management network 145. For example, user device 150 may include a computation and/or communication device, such as a laptop computer, a personal computer, a tablet computer, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), etc. In one implementation, user device 150 may connect to management network 145 to request/retrieve QoS reports for particular customers. In another implementation, user device 150 may connect to customer network 140 to communicate with, for example, management network 145 (e.g., to request QoS reports) or local networks 116.

While implementations herein are described primarily in the context of broadband services via VSAT, other wireless protocols may be used. For example, components conforming to VSAT standards described herein may be replaced by components conforming to other TDMA-type network protocols.

Although FIG. 1 shows example components of network 100, in other implementations, network 100 may contain fewer components, different components, differently arranged components, and/or additional components than those depicted in FIG. 1. Alternatively, or additionally, one or more components of network 100 may perform one or more other tasks described as being performed by one or more other components of network 100.

Figure 2:
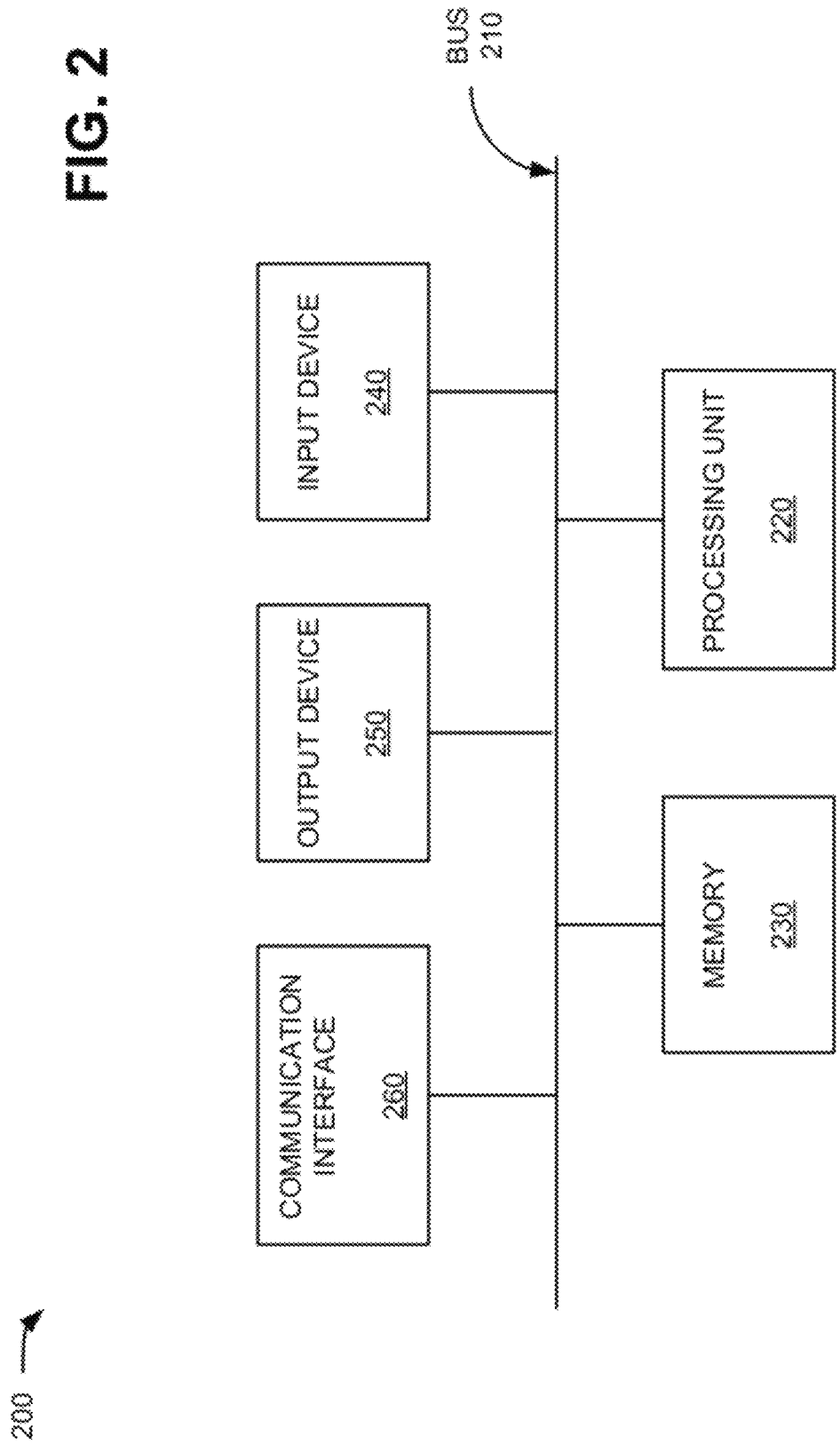
FIG. 2 is a diagram illustrating example components of one of the devices depicted in FIG. 1 according to an implementation described herein.

FIG. 2 is a diagram of example components of a device 200 that may correspond to one of the devices of network 100. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100 and/or customer premises network 110.

As described herein, device 200 may perform certain operations in response to processing unit 220 executing software instructions contained in a non-transitory computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, or additional components than depicted in FIG. 2. Alternatively, or additionally, one or more components of device 200 may perform one or more other tasks described as being performed by one or more other components of device 200.

Figure 3:
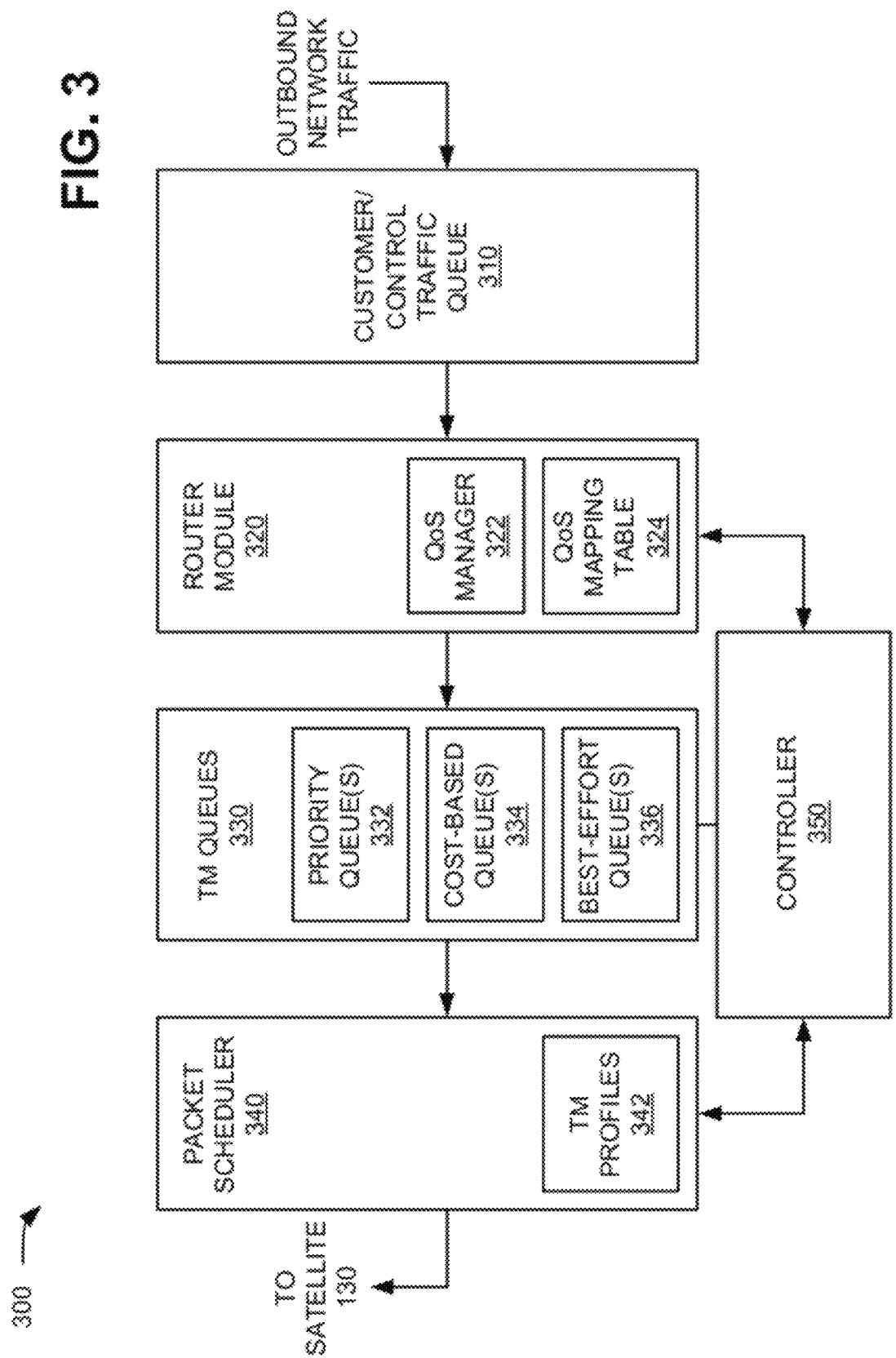
FIG. 3 is a diagram illustrating an example of functional components of a remote interface device or hub depicted in FIG. 1 according to an implementation described herein.

FIG. 3 is a diagram illustrating an example of functional components of a device 300 that may correspond to remote interface device 114 or hub 124 according to an implementation described herein. As shown in FIG. 3, device 300 may include one or more customer and/or control traffic queues 310, a router module 320, traffic management (TM) queues 330, a packet scheduler 340, and a controller 350. Router module 320 may include a QoS manager 322 and a QoS mapping table 324. Traffic management queues 330 may include one or more priority queues 332, one or more cost-based queues 334, and one or more best-effort queues 336. Packet scheduler 340 may include one or more traffic management (TM) profiles 342.

Customer/control traffic queue 310 may include one or more memory devices to receive and buffer outbound customer traffic and/or network control traffic (e.g., traffic traveling from customer site 110 to network hub system 120 or vice versa depending on the location of device 300). Some packets received by customer/control traffic queue 310 may include designated classes of service under one or more standards. For example, traffic may be marked, using a Differentiated Services Code Point (DSCP), IP precedence, or another classification. Traffic may be marked as, for example, voice data, video telephony data, video streaming data, real-time gaming data, application signaling data, third party hosted application data, premium access Internet traffic, best-effort Internet traffic, etc. Other packets received by customer/control traffic queue 310 may be undesignated as to a particular class of service. Packets received by customer/control traffic queue 310 may also include TCP or other (e.g., UDP) transport protocols.

Router module 320 may include hardware or a combination of hardware and software to receive a packet from customer/control traffic queue 310, determine a destination for the received packet, and forward the packet toward the destination. Router module 320 may also differentiate between TCP packets and other (e.g., non-TCP) packets. For example, router module 320 may inspect an IP packet header to determine if the appropriate hexadecimal value in the protocol field corresponds to a TCP packet (e.g., "06"). In an implementation herein, TCP packets may be separated from other (non-TCP) packets to allow device 300 to apply TCP acceleration techniques, which spoof TCP acknowledgements (ACKs) to lessen the impact of latency over a satellite link.

In one implementation, router module 320 may include QoS manager 322 to identify whether a class of service marking is associated with packets received from customer/control traffic queue 310. QoS manager 322 may detect a particular class marking (e.g., a DSCP value or other class of service marking in an IP packet header) for a packet received from customer/control traffic queue 310 and may determine a corresponding profile QoS class to which the particular DSCP class is mapped. For example, QoS manager 322 may access QoS mapping table 324 to retrieve a cross-reference between DSCP classes and profile QoS classes. QoS mapping table 324 may store one or more tables that map a particular DSCP QoS classes and/or IP precedence classes to a particular profile QoS class. Router module 320 may assign each packet from customer/control traffic queue 310 to one of traffic management queues 330 based on a QoS mapping table 324 lookup.

Traffic management queues 330 may include, for example, one or more priority queues 332, one or more cost-based queues 334, and one or more best-effort queues 336. Priority queues 332 may include queues with multiple priority levels. For example, priority queues 332 may be designated for network hub system 120 control packets, border gateway protocol (BGP) packets, expedited forwarding (EF) packets, etc. Cost-based queues 334 may include queues to differentiate between classes of service for a packet and a type of transport layer protocol (e.g., TCP or non-TCP) within each class of service. In one implementation, for example, cost-based queues 334 may include pairs of sub-queues (e.g., a TCP and non-TCP pair) corresponding to each of the DSCP assured forwarding (AF) classes. Best-effort queues 336 may include queues for packets that are not marked with a priority or class of service marking (e.g., a default queue). As described further below with respect to FIG. 4, each queue of cost-based queues 334 and best-effort queues 336 may include a TCP sub-queue and a non-TCP sub-queue.

Packet scheduler 340 may include hardware or a combination of hardware and software to schedule packets from traffic management queues 330 based on an assigned profile (e.g., for customer site 110) and bandwidth during an available DA-TDMA time slot. Remote interface device 114 may receive (e.g., from controller 350 and/or network hub system 120) traffic management profiles 342 that may be stored in and/or accessed by packet scheduler 340. A customer may select a particular traffic management profile that corresponds to a particular type of service. Packet scheduler 340 may receive (e.g., from controller 350) an indication of available bandwidth for a DA-TDMA time slot and may allocate data from traffic management queues 330 according to the selected traffic management profiles. If the current bandwidth and data levels provide no congestion, packet scheduler 340 may simply forward all traffic form traffic management queues 330. If congestion is detected, packet scheduler 340 may allocate a percentage of the available bandwidth to traffic management queues 330 according to the selected traffic management profile.

Packet scheduler 340 may generally apply a scheduling algorithm that first addresses priority queues 332, then cost-based queues 334, and then best-effort queues 336. Queues within priority queues 332 may be scheduled such that each priority level preempts a higher numbered priority level (e.g., a queue "P1" would receive exclusive service until that queue is empty, then a queue "P2" would be serviced). After all priority queues 332 are serviced/emptied, cost-based queues 334 may be serviced based on a particular profile, selected from traffic management profiles 342, to separately account for TCP and non-TCP traffic within each service class. Best-effort queues 336 may be serviced after priority queues 332 and cost-based queues 334 have been serviced. In another implementation, best-effort queues 336 may be serviced based on a particular profile within traffic management profiles 342.

Controller 350 may include hardware or a combination of hardware and software to control operations of router module 320 and packet scheduler 340. For example, controller 350 may maintain the connectivity and manage information necessary for transferring packets from device 300. Controller 350 may, for example, create routing tables based on network topology information, create forwarding tables based on the routing tables, and communicate the forwarding tables to router module 320. Controller 350 may also obtain dynamic bandwidth measurements and provide bandwidth measurement to packet scheduler 340. For example, controller 350 may receive inroute or outroute bandwidth information from network management system 128 and/or monitor bandwidth locally to determine inroute bandwidth from customer site 110 or outroute bandwidth from network management system 128.

In one implementation, controller 350 may also include capabilities for collecting data regarding network performance, such as data about priority application level queuing. For example, controller 350 may monitor and/or receive feedback from packet scheduler 340 and/or router module 320 that may be used to track whether a customer site 110 (e.g., associated with remote interface device 114) is achieving performance consistent with a selected profile. Controller 350 may store the network performance data and provide the network performance data to, for example, a device within management network 145 that may compile data for multiple customer sites 110.

Although FIG. 3 shows example functional components of device 300, in other implementations, device 300 may include fewer functional components, different functional components, differently arranged functional components, or additional functional components than depicted in FIG. 3. Additionally or alternatively, one or more functional components of device 300 may perform one or more tasks described as being performed by one or more other functional components of device 300.

FIG. 4 is a diagram of a portion 400 of an example table of traffic management profiles 342 that may be used by packet scheduler 340 to allocate available bandwidth among traffic management queues 330. As illustrated, table portion 400 may include a variety of information associated with queues (e.g., queues 330). For example, table portion 400 may include a profile type field 410, priority queue fields 420, cost-based class 1 queue fields 430, cost-based class 2 queue fields 440, cost-based class 3 queue fields 450, cost-based class 4 queue fields 460, default queue fields 470, and/or a variety of entries 480 associated with fields 410-470. Each of cost-based class 1 queue fields 430, cost-based class 2 queue fields 440, cost-based class 3 queue fields 450, cost-based class 4 queue fields 460, and default queue fields 470 may include a "TCP" queue field and an "other" (e.g., non-TCP) queue field.

Profile type field 410 may include information designating a profile type for service that may be selected (e.g., purchased) by a customer. Each profile type in profile type field 410 may represent an allocation of bandwidth for each DA-TDMA time slot available to a customer site 110. Each customer site 110 may generally be associated with a single profile type. While five profile types 410 (e.g., "Tier 1," "Tier 2," "Tier 3," "Tier 4", and "Standard") are shown in FIG. 4, more or fewer profile types may be included in other implementations.

Priority forwarding field 420 may include a percentage value (e.g., 100%) for a maximum bandwidth for priority traffic (such as traffic from priority queue 332). In one implementation, entries for priority forwarding field 420 may be set at 100% to permit priority traffic (e.g., from priority queue 332) to consume all available bandwidth at the expense of all other data queues (e.g., cost-based queues 334 and best-effort queues 336). In another implementation, an entry of priority forwarding field 420 may be excluded from a profile (e.g., as shown for "Tier 4") or included at a value less than 100%.

Cost-based class 1 queue fields 430, cost-based class 2 queue fields 440, cost-based class 3 queue fields 450, cost-based class 4 queue fields 460, and default fields 470 may each include a percentage value (e.g., 29.6%, 17.4%, 30%, 10%, 7.5%, etc.) for a maximum bandwidth allotted to traffic from queues corresponding to each of cost-based class 1 queue fields 430, cost-based class 2 queue fields 440, cost-based class 3 queue fields 450, cost-based class 4 queue fields 460, and default fields 470. In one implementation, cost-based class 1 queue fields 430, cost-based class 2 queue fields 440, cost-based class 3 queue fields 450, cost-based class 4 queue fields 460, and default fields 470 may correspond to cost-based queues 334.

As shown in FIG. 4, cost-based class 1 queue fields 430, cost-based class 2 queue fields 440, cost-based class 3 queue fields 450, cost-based class 4 queue fields 460, and default fields 470 may each include a pair of sub-fields (e.g., "TCP" and "Other," corresponding to respective TCP and non-TCP sub-queues for each class), to differentiate regular traffic from TCP traffic (which typically requires spoofing of TCP ACK messages over a satellite interface to prevent time-out failures). The allocated percentages for each entry in a sub-field pair (e.g., "TCP" and "Other") may be equal, but excess capacity may be shared within a cost-based class queue. For example, as shown in FIG. 4, Tier 1 profile (of profile type field 410) may include, in cost-based class 1 queue fields 430, values of 29.6% for "TCP" and 29.6% for "Other." If no TCP traffic is available in a corresponding sub-queue for cost-based class 1, packet scheduler 340 may allocate the aggregate total (e.g., 59.2% or 29.6%+29.6%) of available bandwidth to other (e.g., non-TCP) cost-based class 1 traffic.

Profiles types (e.g., in profile type field 410) may be selected by customers to best provide particular services. For example, bandwidth allocation percentages may be configured (e.g., for a particular tier type) to match percentages in a terrestrial Private IP (PIP) network, to favor data-centric traffic, to protect mission-critical data, etc. The percentages shown in entries 480 of table portion 400 are provided for illustrative purposes. Different percentages and/or combinations of percentages may be used.

Although FIG. 4 shows example fields of table portion 400, in other implementations, table portion 400 may include different fields, additional fields, fewer fields, or differently arranged fields than depicted in FIG. 4.

FIGS. 5 and 6 are flow charts of an example process 500 for providing QoS over a satellite network according to implementations described herein. In one implementation, process 500 may be performed by remote interface device 114 or hub 124. In another implementation, some or all of process 500 may be performed by another device or group of devices, including or excluding remote interface device 114 or hub 124.

As illustrated in FIG. 5, process 500 may include downloading a subscriber profile for a VSAT network (block 510). For example, in implementations described above in connection with FIG. 3, packet scheduler 340 may schedule packets from traffic management queues 330 based on an assigned profile (e.g., for customer site 110) and bandwidth during an available DA-TDMA time slot. Remote interface device 114 may receive (e.g., from network hub system 120) traffic management profiles 342 that may be stored in and/or accessed by packet scheduler 340. A customer may select a particular traffic management profile that corresponds to a particular type of service.

Returning to FIG. 5, process 500 may include receiving, from a local network, packets with class of service markings (block 520), and differentiating between TCP and non-TCP packets of the received packets (block 530). For example, in implementations described above in connection with FIG. 3, customer/control traffic queue 310 may receive and buffer inroute customer traffic and/or network control traffic (e.g., traffic traveling from customer site 110 to network hub system 120). Some packets received by customer/control traffic queue 310 may include designated classes of service under one or more standards. Router module 320 may receive packets from customer/control traffic queue 310 and may also differentiate between TCP packets and other (e.g., non-TCP) packets. For example, router module 320 may inspect an IP packet header to determine if the appropriate hexadecimal value in the protocol field corresponds to a TCP packet.

Returning again to FIG. 5, process 500 may include assigning packets to traffic management queues based on the class of service markings and TCP/non-TCP differentiation (block 540). For example, in implementations described above in connection with FIG. 3, router module 320 may include QoS manager 322 to identify whether a class of service marking is associated with packets received from customer/control traffic queue 310. QoS manager 322 may detect a particular class marking (e.g., a DSCP value or other class of service marking in an IP packet header) for a packet received from customer/control traffic queue 310 and may determine a corresponding profile QoS class to which the particular DSCP class is mapped. For example, QoS manager 322 may access QoS mapping table 324 to retrieve a cross-reference between DSCP classes and profile QoS classes. QoS mapping table 324 may store one or more tables that map a particular DSCP QoS classes and/or IP precedence classes to a particular profile QoS class. Router module 320 may assign each packet from customer/control traffic queue 310 to one of traffic management queues 330. Cost-based queues 334 and best-effort queues 336 within traffic management queues 330 may include a TCP sub-queue and a non-TCP sub-queue.

Returning to FIG. 5, process 500 may include configuring the device for current data limits (block 550), and forwarding packets from the traffic management queues based on the profile percentages and current data limits (block 560). For example, in implementations described above in connection with FIG. 3, packet scheduler 340 may generally apply a scheduling algorithm that first addresses priority queues 332, then cost-based queues 334, and then best-effort queues 336. Queues within priority queues 332 may be scheduled such that each priority level preempts a higher numbered priority level (e.g., a queue P1 would receive exclusive service until that queue is empty, then a queue P2 would be serviced). After all priority queues 332 are serviced/emptied, cost-based queues 334 may be serviced based on a particular profile, selected from traffic management profiles 342, to separately account for TCP and non-TCP traffic within each service class. Best-effort queues 336 may be serviced after priority queues 332 and cost-based queues 334 have been serviced.

Referring still to FIG. 5, process 500 may include recording traffic management QoS data (block 570), and sending the traffic management QoS data to a customer network (block 580). For example, in implementations described above in connection with FIG. 3, controller 350 may include capabilities for collecting data regarding network performance, such as data about traffic management queuing. For example, controller 350 may monitor and/or receive feedback from packet scheduler 340 and/or router module 320 that may be used to track whether a customer site 110 (e.g., associated with remote interface device 114) is achieving performance consistent with a selected profile. Controller 350 may store the network performance data and provide the network performance data to, for example, a device within customer network 140 that may compile data for multiple customer sites 110.

Process block 550 may include the process blocks depicted in FIG. 6. As shown in FIG. 6, process block 550 may include determining a dynamic bandwidth value for a DA-TDMA burst (block 600), and determining a bandwidth allocation for each traffic management queue based on the profile cost (block 610). For example, controller 350 may obtain dynamic bandwidth measurements and provide bandwidth measurement to packet scheduler 340. Controller 350 may receive inroute bandwidth information from network hub system 120 and/or monitor bandwidth locally to determine inroute bandwidth from customer site 110. If the inroute bandwidth from customer site 110 is in contention, packet scheduler 340 may allocate a percentage of the available bandwidth, for a particular DA-TDMA time slot, to traffic management queues 330 according to the selected traffic management profile.

Process block 550 may further include determining whether a TCP sub-queue or other sub-queue is using its allocated bandwidth (block 620). If one of the TCP sub-queue or other sub-queue is not using its allocated bandwidth (block 620—NO), the aggregated bandwidth for the TCP sub-queue and other sub-queue may be allocated to the active sub-queue (block 630). For example, as described above in connection with FIG. 4, cost-based class 1 queue fields 430, cost-based class 2 queue fields 440, cost-based class 3 queue fields 450, cost-based class 4 queue fields 460, and default fields 470 may each include a pair of sub-fields (e.g., "TCP" and "Other," corresponding to respective TCP and non-TCP sub-queues for each class. The allocated percentages for each entry in a sub-field pair (e.g., "TCP" and "Other") may be equal, but excess capacity may be shared within a cost-based class queue. For example, Tier 1 profile (of profile type field 410) may include, in cost-based class 1 queue field 430, values of 29.6% for "TCP" and 29.6% for "Other." If no TCP traffic is available in a corresponding sub-queue for cost-based class 1, packet scheduler 340 may allocate the aggregate total (e.g., 59.2% or 29.6%+29.6%) of available bandwidth to the active queue with non-TCP (e.g., "other") cost-based class 1 traffic.

If the bandwidth for the TCP sub-queue and other sub-queue may be allocated to the active sub-queue (block 630) or if both of the TCP sub-queue or other sub-queue are using their allocated bandwidth (block 620—YES), packets may be scheduled for forwarding during the a DA-TDMA time slot (block 640). For example, packet scheduler 340 may schedule packets based on the current TM profile 342.

Systems and/or methods described herein may store a traffic management profile for outbound satellite network traffic that provides default percentages for classes of traffic that can pass if contention for limited bandwidth exists. The systems and/or methods may receive packets having class markings and designated for delivery over a Demand-Assigned Time Division Multiple Access (DA-TDMA) network and nay identify each of the received packets as one of a transmission control protocol (TCP) packet or a non-TCP packet. The systems and/or methods may assign the received packets to different queues based on the class markings and the identifying as a TCP packet or non-TCP packet, and may determine available transmission bandwidth for a particular time slot of the DA-TDMA network associated with the device. The systems and/or methods may also schedule packets from the different queues based on the default percentages in the traffic management profile and the transmission bandwidth for the particular time slot.

The foregoing description provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 5 and 6, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" that performs one or more functions. These components may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a network device, a traffic management profile for outbound satellite traffic, wherein the traffic management profile indicates percentages of available bandwidth allocated to each queue, of a plurality of queues, for a time slot based upon a class assigned to each queue, wherein each queue includes a transmission control protocol (TCP) sub-queue for TCP packets and a non-TCP sub-queue for non-TCP packets, and wherein the traffic management profile indicates percentages of available bandwidth allocated to each TCP sub-queue and each non-TCP sub-queue;
   receiving, by the network device, outbound packets that include class markings;
   identifying, by the network device, each of the received outbound packets as one of a TCP or a non-TCP packet;
   assigning, by the network device, the received outbound packets to different queues, of the plurality of queues, and to a TCP sub-queue or a non-TCP sub-queue based on the class markings and the identifying as a TCP or non-TCP packet;
   determining, by the network device, a bandwidth limit for outbound satellite traffic for a particular time slot; and
   scheduling, by the network device, packets from the different queues based on the traffic management profile and the bandwidth limit for the particular time slot.

2. The method of claim 1, where the TCP sub-queue and the non-TCP sub-queue for a particular queue correspond to a single class.

3. The method of claim 2, where scheduling packets from the different queues comprises:
   identifying, from the traffic management profile, a cost associated with packets from each different queue;
   determining a bandwidth allocation for each different queue based on the cost; and
   aggregating the bandwidth allocation for the TCP sub-queue and non-TCP sub-queue corresponding to a single class when one of the TCP sub-queue or non-TCP sub-queue is empty.

4. The method of claim 1, where the traffic management profile provides default percentages for classes of traffic that can pass if contention for limited bandwidth exists.

5. The method of claim 4, where the default percentages of available bandwidth allocated to each queue of the traffic management profile are based on a cost assigned to each of the different queues.

6. The method of claim 4, where the default percentages correspond to percentages of a fixed-bandwidth quality of service (QoS) model.

7. The method of claim 1, further comprising:
   sending the scheduled packets over a satellite network connection of a Demand-Assigned Time Division Multiple Access (DA-TDMA) network.

8. The method of claim 1, where the traffic management profile is selected from a group of pre-defined traffic management profiles available to customers.

9. The method of claim 1, further comprising:
   recording traffic management data from the different queues; and
   sending the recorded traffic management data to another device.

10. The method of claim 9, further comprising:
    compiling the recorded traffic management data with traffic management data from other network devices within a Demand-Assigned Time Division Multiple Access (DA-TDMA) network.

11. A device, comprising:
    one or more memories to store a plurality of instructions and a traffic management profile for outbound satellite network traffic, wherein the traffic management profile indicates percentages of available bandwidth allocated to each queue, of a plurality of queues, for a time slot based upon a class assigned to each queue, wherein each queue includes a transmission control protocol (TCP) sub-queue for TCP packets and a non-TCP sub-queue for non-TCP packets wherein the traffic management profile indicates percentages of available bandwidth allocated to each TCP sub-queue and each non-TCP sub-queue, and where the traffic management profile provides default percentages for classes of traffic that can pass when contention for limited bandwidth exists; and one or more processors to execute instructions in the one or more memories to:
receive, from a local network, packets that include class markings and are designated for outbound delivery over a Demand-Assigned Time Division Multiple Access (DA-TDMA) network,
identify each of the received packets as one of a TCP packet or a non-TCP packet,
assign the received packets to different queues, of the plurality of queues, and to a TCP sub-queue or a non-TCP sub-queue based on the class markings and the identifying as a TCP packet or non-TCP packet,
determine available outbound bandwidth for a particular time slot of the DA-TDMA network associated with the device, and
schedule packets from the different queues based on the default percentages in the traffic management profile and the outbound bandwidth for the particular time slot.

12. The device of claim 11, where the device includes one of:
a network device located at a remote site of a satellite network, or
a network device located at a network hub system of the satellite network.

13. The device of claim 11, where the TCP sub-queue and the non-TCP sub-queue for a particular queue correspond to a single class.

14. The device of claim 13, where the one or more processors are further to execute instructions in the one or more memories to:
apply TCP acceleration techniques to the received packets assigned to the TCP sub-queue.

15. The device of claim 13, where, when scheduling packets from the different queues, the one or more processors are further to execute instructions in the one or more memories to:
aggregate bandwidth allocations for the TCP sub-queue and non-TCP sub-queue corresponding to a single class when one of the TCP sub-queue or non-TCP sub-queue is empty.

16. The device of claim 11, where the default percentages of the available bandwidth allocated to each queue of the traffic management profile correspond to percentages of a fixed-bandwidth quality of service (QoS) model.

17. The device of claim 11, where the one or more processors are further to execute instructions in the one or more memories to:
record traffic management data from the different queues.

18. A system, comprising:
a network hub system, including one or more network devices, for a satellite network; and
a plurality of remote sites connected to the network hub system in a Demand-Assigned Time Division Multiple Access (DA-TDMA) network, where each of the remote sites:
stores a traffic management profile, particular to the remote site, for inroute satellite traffic, wherein the traffic management profile indicates percentages of available bandwidth allocated to each queue, of a plurality of queues, for a time slot based upon a class assigned to each queue, wherein each queue includes sub-queues for traffic based on whether the traffic includes transmission control protocol (TCP) packets, and wherein the traffic management profile indicates percentages of available bandwidth allocated to each sub-queue, and where the traffic management profile includes default percentages for classes of traffic that can pass if contention for limited bandwidth exists,
receives packets that include class markings and are designated for inroute delivery over the DA-TDMA network,
assigns the packets to different priority queues and sub-queues based on the class markings,
determines available inroute bandwidth for a particular time slot of the DA-TDMA network associated with the remote site, and
schedules packets from the different priority queues based on the default percentages in the traffic management profile and the available inroute bandwidth for the particular time slot.

19. The system of claim 18, where the network hub system:
stores traffic management profiles, particular to each of the remote sites, for outroute satellite traffic, where each of the traffic management profiles includes default percentages of the available bandwidth allocated to each queue for classes of traffic that can pass when contention for limited bandwidth exists,
receives packets that include class markings and are designated for outroute delivery, to one of the remote sites, over the DA-TDMA network,
assigns the packets to different priority queues and sub-queues based on the class markings,
determines available outroute bandwidth for a particular time slot of the DA-TDMA network associated with the one of the remote sites, and
schedules the packets from the different priority queues based on the default percentages in the traffic management profile and the available outroute bandwidth for the particular time slot.

20. The system of claim 18, further comprising:
a reporting system to receive traffic management data from the network hub system and the remote sites and to generate reporting statistics regarding traffic management of the DA-TDMA network.

* * * * *